United States Patent
Jang et al.

(10) Patent No.: US 11,440,419 B2
(45) Date of Patent: Sep. 13, 2022

(54) METHOD OF CONTROLLING GEAR SHIFTING IN ELECTRIC VEHICLE

(71) Applicants: HYUNDAI MOTOR COMPANY, Seoul (KR); KIA CORPORATION, Seoul (KR)

(72) Inventors: Cheol Ho Jang, Hwaseong-si (KR); Gi Young Kwon, Seoul (KR); Sang Jun Han, Seoul (KR); Ji Hyun Park, Hwaseong-si (KR); Jae Yun Jung, Hwaseong-si (KR); Min Su Kim, Busan (KR); Jeong Soo Park, Cheongju-si (KR); Jae Chang Kook, Hwaseong-si (KR); Min Kyu Lee, Seoul (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 0 days.

(21) Appl. No.: 17/365,539

(22) Filed: Jul. 1, 2021

(65) Prior Publication Data

US 2022/0169122 A1 Jun. 2, 2022

(30) Foreign Application Priority Data

Dec. 2, 2020 (KR) .................. 10-2020-0166379

(51) Int. Cl.
*B60W 10/08* (2006.01)
*B60W 10/10* (2012.01)
(Continued)

(52) U.S. Cl.
CPC ......... *B60L 15/2054* (2013.01); *B60W 10/08* (2013.01); *B60W 10/11* (2013.01);
(Continued)

(58) Field of Classification Search
CPC ............ B60L 15/2054; B60L 2240/14; B60L 2240/421; B60L 2240/423; B60L 2240/486; B60L 2250/28; B60W 10/08; B60W 10/11; B60W 30/19; B60W 20/30; B60W 2510/081; B60W 2510/083;
(Continued)

(56) References Cited

U.S. PATENT DOCUMENTS

2018/0162367 A1* 6/2018 Oh .................. B60W 10/11
2020/0180628 A1* 6/2020 Choi ............... B60W 30/18027
2021/0387612 A1* 12/2021 Park ................. B60W 10/02

FOREIGN PATENT DOCUMENTS

KR        20120021093 A * 3/2012 ............ B60W 10/10
KR        10-2018-0048120 A  5/2018

* cited by examiner

*Primary Examiner* — Tisha D Lewis
(74) *Attorney, Agent, or Firm* — Lempia Summerfield Katz LLC

(57) ABSTRACT

A method of controlling gear shifting in an electric vehicle includes: determining whether or not an electric vehicle travels in an electric vehicle (EV) traveling mode; determining whether or not kick-down gear shifting is required in the EV traveling mode; determining whether or not acceleration linearity control is possible, in a case where the kick-down gear shifting is required; performing correction of a torque of a motor in a case where the acceleration linearity control is possible; and performing gear shifting in a transmission on the basis of the corrected torque of the motor.

8 Claims, 4 Drawing Sheets

(51) Int. Cl.
*B60W 30/19* (2012.01)
*B60L 15/20* (2006.01)
*B60W 10/11* (2012.01)
*B60K 6/547* (2007.10)
*B60W 20/30* (2016.01)

(52) U.S. Cl.
CPC ............. *B60W 30/19* (2013.01); *B60K 6/547* (2013.01); *B60L 2240/14* (2013.01); *B60L 2240/421* (2013.01); *B60L 2240/423* (2013.01); *B60L 2240/486* (2013.01); *B60L 2250/28* (2013.01); *B60W 20/30* (2013.01); *B60W 2510/081* (2013.01); *B60W 2510/083* (2013.01); *B60W 2540/103* (2013.01); *B60W 2710/083* (2013.01); *B60W 2710/1005* (2013.01); *B60Y 2200/91* (2013.01); *B60Y 2200/92* (2013.01); *B60Y 2300/57* (2013.01); *B60Y 2300/70* (2013.01)

(58) Field of Classification Search
CPC ..... B60W 2540/103; B60W 2710/083; B60W 2710/1005; B60K 6/547; B60Y 2200/91
See application file for complete search history.

FIG. 1 "PRIOR ART"
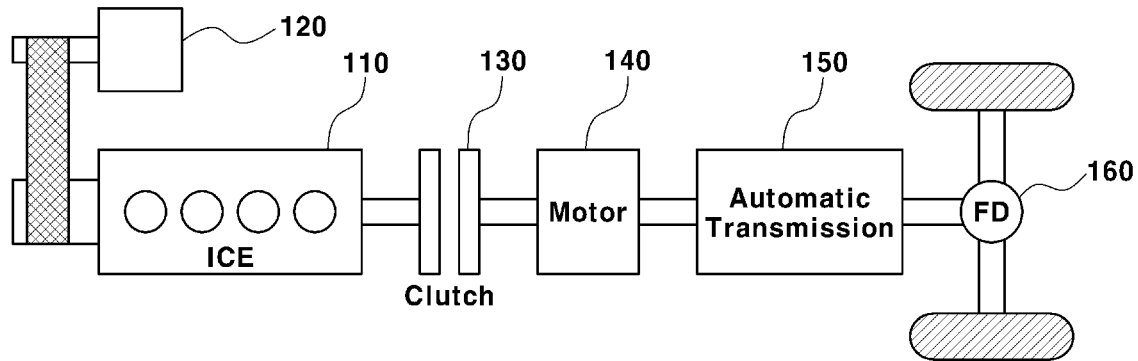
FIG. 2 "PRIOR ART"
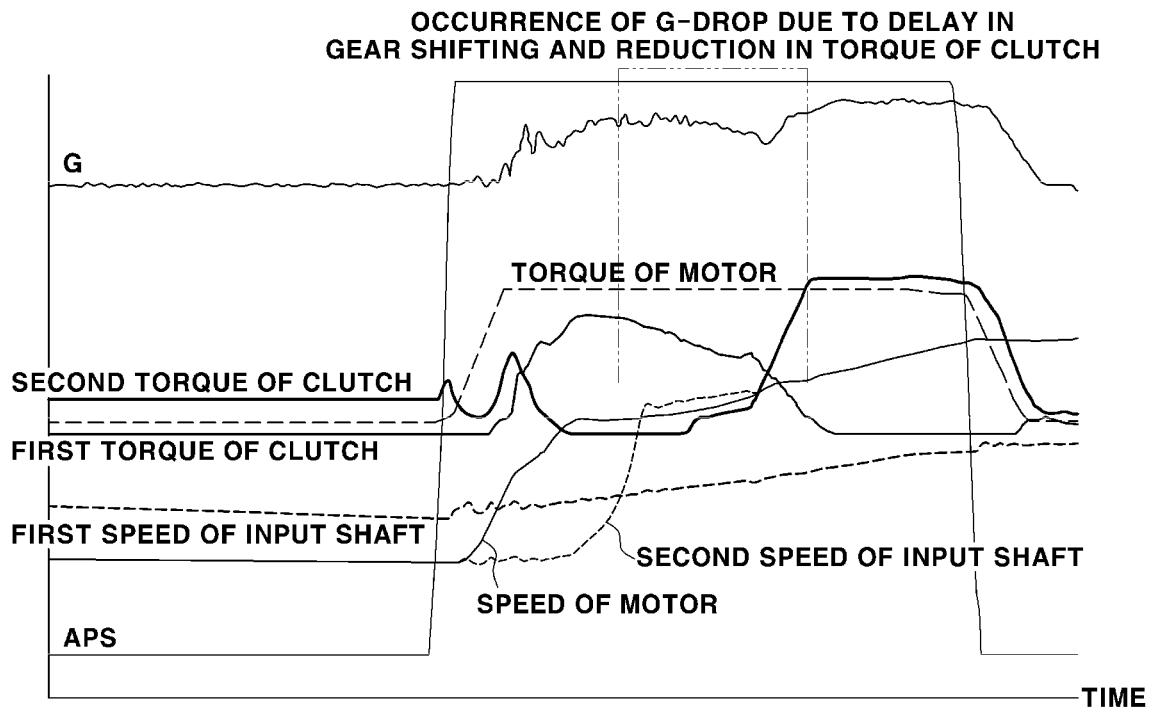

METHOD OF CONTROLLING GEAR SHIFTING IN ELECTRIC VEHICLE

CROSS REFERENCE TO RELATED APPLICATION

This application claims priority to and the benefit of Korean Patent Application No. 10-2020-0166379, filed on Dec. 2, 2020, the entire contents of which are incorporated herein by reference.

FIELD

The present disclosure relates to a method of controlling gear shifting in an electric vehicle and, more specifically, to a method of controlling gear shifting, which is capable of performing correction of torque of a motor when gear shifting is performed.

BACKGROUND

The statements in this section merely provide background information related to the present disclosure and may not constitute prior art.

Environment-friendly vehicles have been developed to improve the fuel efficiency and comply with tightened government regulations of exhaust gas. Typical examples of these vehicles include an electric vehicle and plug-in hybrid electric vehicles (PHEV).

The electric vehicle and plug-in hybrid electric travel using a power sources: a motor. Therefore, optimal output and torque can be provided, depending on how effectively the engine and the motor are caused to operate in conjunction with each other while the vehicle travels. Particularly, the output of the engine and the output of the motor are transferred at the same time in the hybrid vehicle equipped with a parallel-type or transmission mounted electric device (TMED)—type hybrid system in which an electric motor and an engine clutch (EC) are installed between the engine and transmission.

FIG. 1 illustrates an example of a power train structure of a general hybrid vehicle.

More specifically, FIG. 1 illustrates a power train of the hybrid vehicle equipped with a parallel type hybrid system equipped with an electric motor (or a drive motor) 140 and an engine clutch 130 installed between an internal combustion engine (ICE) 110 and an automatic transmission 150.

Generally, in a case where, in such a hybrid vehicle, a driver depresses an accelerator pedal after starting the engine (that is, in a case where an accelerator pedal sensor is turned on), the motor 140 is first driven using power of a battery in a state where the engine clutch 130 is disengaged, and a motive force of the motor 140 is transferred to wheels through the automatic transmission 150 and a final drive (FD) 160, thereby rotating the wheels (that is, the vehicle travels in an electric vehicle "EV" mode). When the vehicle is gradually accelerated and thus a greater drive force is desired, an auxiliary motor (or a starting power generation motor) 20 operates to drive the engine 110.

Accordingly, when the engine 110 and the motor 140 have the same RPM (revolutions per minute), the engine clutch 130 is engaged, and thus the engine 110 and the motor 140 drive the vehicle together.

In addition, a stepped transmission or a multi-plate clutch, for example, a dual clutch transmission (DCT) is used as the automatic transmission 150. The automatic transmission 150 includes a clutch engaged with the engine 110 or the motor 140, and repeatedly performs disengaging and engaging of clutch to change a gear step.

However, we have discovered that in a case where a kick-down request is made in an equal-power section for the motor while the vehicle travels in the EV mode, driving torque of the motor tends to decrease. While gear shifting is performed, this tendency causes a delay in RPM synchronization control, a delay in responsiveness, and occurrence of a G-drop phenomenon.

Moreover, recent electric vehicles using a transmission frequently have the same problems as the electric vehicles, such as a delay in gear-shift responsiveness.

FIG. 2 illustrates the G-drop phenomenon and the delay in the gear shifting that, as described above, occur in a case where the kick-down request is made in the equal-power section for the motor.

The foregoing is intended merely to aid in the understanding of the background of the present disclosure, and is not intended to mean that the present disclosure falls within the purview of the related art that is already known to those skilled in the art.

SUMMARY

The present disclosure provides a method of controlling gear shifting in an electric vehicle, which is capable of performing correction of driving torque of a motor after gear shifting is performed and thus inhibiting or preventing a reduction in torque of the motor after kick-down gear shifting is performed.

In another form, the present disclosure provides a method of controlling gear shifting in an electric vehicle, which is capable of correcting torque of a motor with reference to a ratio of a change in an RPM of the motor on the basis of pre-gear shifting torque of the motor and post-gear shifting torque of the motor, when gear shifting is performed.

The present disclosure is not limited to the above-described objectives. Objectives other than the above-described objectives will be clearly understood from the following descriptions of forms of the present disclosure. In addition, the objectives of the present disclosure will be accomplished by subject matters recited in claims.

In order to accomplish the above-described objectives of the present disclosure, a method of controlling gear shifting in an electric vehicle is configured as follows.

According to an aspect of the present disclosure, a method of controlling gear shifting in an electric vehicle may include: determining whether or not an electric vehicle travels in an EV traveling mode; determining whether or not kick-down gear shifting is required in the EV traveling mode; in response to determining that the kick-down gear shifting is required, determining whether or not acceleration linearity control is possible; in response to determining that the acceleration linearity control is possible, performing correction of a torque of a motor; and performing gear shifting in a transmission on the basis of the corrected torque of the motor.

The method may further include: in response to determining that the kick-down gear shifting is required, determining whether or not a user inputs an acceleration linearity constant-control request; and in response to determining that the acceleration linearity constant-control request is input, determining whether or not a gear-shift synchronization section is reached.

The method may further include: in response to determining that the kick-down gear shifting is required, determining whether or not a user inputs an acceleration linearity selective-control request; in response to determining that the acceleration linearity selective-control request is input, determining whether or not a point in time when the motor operates after the gear shifting is performed is in a de-rating section; and in response to determining that the point in time is in the de-rating section, determining whether or not a gear-shift synchronization section is reached.

The method may further include calculating final torque of the motor by multiplying a sum of de-rating torque of the motor and margin torque by a synchronization ratio and then adding the result of the multiplication to a torque command to the motor, in the performing of the correction of the torque of the motor, the torque command being received from a controller.

In the method, the de-rating torque of the motor may be calculated as a difference between a pre-gear shifting torque of the motor and a post-gear shifting torque of the motor.

In the method, the synchronization ratio may be calculated as a ratio of a value of a difference between a current RPM of the motor and a pre-gear shifting driving RPM of the motor to a value of a difference between a post-gear shifting target RPM of the motor and a pre-gear shifting driving RPM of the motor when the gear shifting is performed.

In the method, the torque command to the motor may be a command stored in the controller.

The method may further include determining that the kick-down gear shifting is required, in a case where an amount of pressure applied to an accelerator pedal is at or above a first reference value, in the determining of whether or not the kick down gear shifting is required in the EV traveling mode.

According to the present disclosure, the following advantages are obtained with the forms described above, and configurations, combinations, and application-based relationships that will be described below.

According to the present disclosure, the correction of the torque of the motor is performed. Thus, the advantage of improving the responsiveness to the user can be achieved.

According to the present disclosure, the correction of output torque of the motor is performed in real time with reference to the RPM of the motor, thereby continuously increasing the torque of the motor when the gear shifting is performed. Thus, the advantage of providing the acceleration linearity can be achieved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a view illustrating a configuration of an electric vehicle;

FIG. 2 is a graph illustrating a change in a driving relationship, which takes place when kick-down gear shifting is performed, according to the related art;

Figure 3:
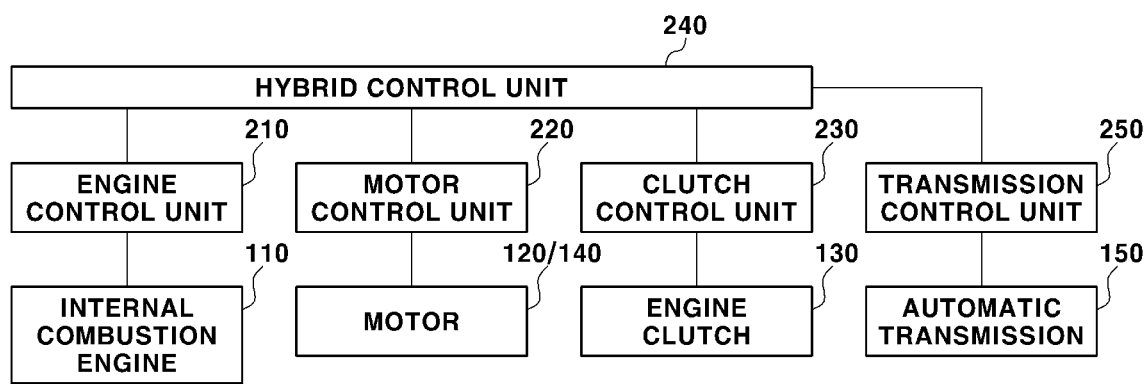
FIG. 3 is a view illustrating a configuration of a controller performing a method of controlling gear shifting in an electric vehicle according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Exemplary forms of the present disclosure will be modified in various forms, and the scope of the present disclosure should not be interpreted as being limited to the following forms. The exemplary forms are provided to enable a person of ordinary skill in the art to get a better understanding of the present disclosure.

The terms "unit", "module", and the like, which are used throughout the specification, mean an individual component that performs at least one function or operation and may be realized in hardware, software, or a combination of both.

In addition, examples of an electric vehicle (EV) mode used throughout the present specification include an EV traveling mode in an electric vehicle and EV traveling mode in a plug-in hybrid vehicle in terms of concept.

In the following description that is provided with reference to the accompanying drawings, the same constituent elements or constituent elements corresponding to each other are given the same reference character, and the same description thereof is not repeated.

The present disclosure relates to a method of controlling gear shifting in an electric vehicle and, more particularly, to a method of controlling gear shifting when kick-down gear shifting is performed in an electric vehicle, which includes a scheme in which a plug-in hybrid vehicle travels in an EV mode or a scheme in which a motor 120 is driven to apply torque for the plug-in hybrid vehicle.

Moreover, the present disclosure relates to a method of performing control for correction of torque of a motor 120 in a case where a kick-down gear shifting request is made in an equal-power section for the motor 120.

The equal-power section for the motor 120 means a section where the torque of the motor 120 decreases with an increase in an RPM of the motor 120, and, throughout the present specification, has the same meaning as a de-rating section.

A gear-shift synchronization section is a section where the RPM of the motor 120 that starts from a pre-gear shifting driving RPM and follows a post-gear shifting target RPM, starting from a pre-gear shifting driving RPM. The gear-shift synchronization section means a section where, from a point in time when the gear shifting occurs, the RPM of the motor 120 increases continuously to a post-gear shifting RPM. Moreover, a synchronization ratio means a ratio of a value of a difference between a current RPM of the motor 120 and the pre-gear shifting driving RPM to a value of a difference between the post-gear shifting target RPM and the pre-gear shifting driving RPM.

Therefore, the synchronization ratio is set to be calculated in the gear-shift synchronization section, and is set to be calculated in real time at each point in time when the gear shifting is performed.

FIG. 3 illustrates a configuration of a controller performing a method of controlling gear shifting in an electric vehicle according to an exemplary form of the present disclosure.

More specifically, FIG. 3 illustrates a controller of the plug-in hybrid vehicle which causes the plug-in hybrid vehicle to travel in the EV traveling mode.

In the hybrid vehicle, an internal combustion engine 110 is controlled by an engine control unit 210, torque of each of the starting power-generation motor 120 and the electric motor 120 is controlled by a motor control unit (MCU) 220, and an engine clutch 130 is controlled by a clutch control unit 230. The engine control unit 210 is also referred to as an engine management system (EMS). In addition, a transmission 150 is controlled by a transmission control unit (TCU) 250. According to the situation, respective motor control units of the starting power-generation motor 120 and the electric motor 120 may be provided separately from each other.

Each of the control units is connected to a hybrid control unit (HCU) 240, as a control unit at a higher level than each of the control units, which controls an overall mode switching process. When a traveling mode is switched and the gear shifting is performed, under the control of the hybrid control unit 240, each of the control units provides information desired for the control of the engine clutch 130 and/or the engine 110 (e.g., stopping the engine 110) to the hybrid control unit 240 or performs an operation according to a control signal.

More specifically, the hybrid control unit 240 determines whether or not to perform mode switch, according to a driven state of the vehicle. As an example, the hybrid control unit 240 determines a point in time at which the engine clutch 130 is released (open), and performs hydraulic pressure control (in the case of a wet engine clutch) or torque capacity control (in the case of the dry engine clutch 130). In addition, the hybrid control unit 240 determines a state (a lock-up, slip, or open state) of the engine clutch 130 and adjusts a point in time at which fuel stops being injected into the engine 110. In addition, the hybrid control unit 240 transfers a torque command for controlling torque of the starting power-generation motor 120 to the motor control unit 220 in order to perform the control for stopping the engine 110, and controls recovery of engine revolution energy. Moreover, the hybrid control unit 240 learns previous traveling data and applies current traveling data. Thus, the hybrid control unit 240 calculates DTE (data terminal equipment) information according to a state of charge (SOC) of the battery.

Of course, it is apparent to a person of ordinary skill in the art that the connection relationship between the control units, the function of each control unit, and the distinction between the control units are described above for the purpose of illustration and that the present disclosure is not limited to the names of the control units. For example, the hybrid control unit 240 may be configured in such a manner that a function thereof is replaced with that of one of the other control units and in such a manner that a function thereof is distributed to two or more of the other control units.

In addition, the term "controller" throughout the present specification may refer to the hybrid control unit 240 and may refer to a control unit at a lower level than the hybrid control unit 240.

A method of controlling gear shifting according to one form of the present disclosure will be described below, with reference to the above-described configuration of the vehicle.

According to the form of the present disclosure, the controller retains an RPM, based on each of the gears in the transmission 150, of the motor 120, and a numerical value of the torque of the motor 120. This RPM of the motor 120 is stored in the controller before linearity control of the torque of the motor 120 is performed. The controller sets the torque and RPM of the motor 120 that are applied before and after transmission 150 performs the gear shifting, on the basis of the RPM of the motor 120 and the numerical value of the RPM of the motor 120. Moreover, the correction of the torque of the motor 120 is set to be performed in a case where a user makes the kick-down gear shifting request in the equal-power section for the motor 120, while the plug-in hybrid vehicle travels in the EV mode.

In order to perform the correction of the torque of the motor 120, a value, stored in the controller, of pre-gear shifting torque of the motor 120 and a value of post-gear shifting torque of the motor 120 are set to be compared with each other in order to calculate de-rating torque. That is, the de-rating section or the equal-power section for the motor 120 means a section where the value of the pre-gear shifting torque of the motor 120 is higher than the value of the post-gear shifting torque of the motor 120.

Moreover, the controller is configured to calculate respective storage values of the pre-gear shifting driving RPM of the motor 120 and the post-gear shifting target RPM of the motor 120, to compare the RPM of the motor 120, which is measured in real time when the gear shifting is performed, with the calculated storage values, and to calculate the synchronization ratio. The synchronization ratio is calculated in the gear-shift synchronization section. The gear-shift synchronization section means a section where the RPM of the motor 120 follows the target RPM when the gear shifting is performed. Therefore, the gear-shift synchronization section is a section where the gear shifting is performed, and means a section where the RPM of the motor 120 is controlled. Moreover, an RPM ratio of the motor 120, which applies in the gear-shift synchronization section when the gear shifting is performed is set to be calculated, and a correction value of the torque of the motor 120, which is set to be in the control unit, is set to be calculated.

The correction value for performing the correction of the torque of the motor 120 is obtained by calculating a final torque of the motor 120. The final torque of the motor 120 results from multiplying the sum of the de-rating torque of the motor 120 and margin torque by the synchronization ratio and then adding the result of the multiplication to the torque command to the motor 120, which is received from the control unit.

The de-rating torque is calculated as a difference between the pre-gear shifting torque of the motor 120, which is stored in the controller before acceleration linearity control is performed, and the post-gear shifting torque of the motor 120. The synchronization ratio is calculated as the RPM ratio of the motor 120 in the gear-shift synchronization section.

Figure 4:
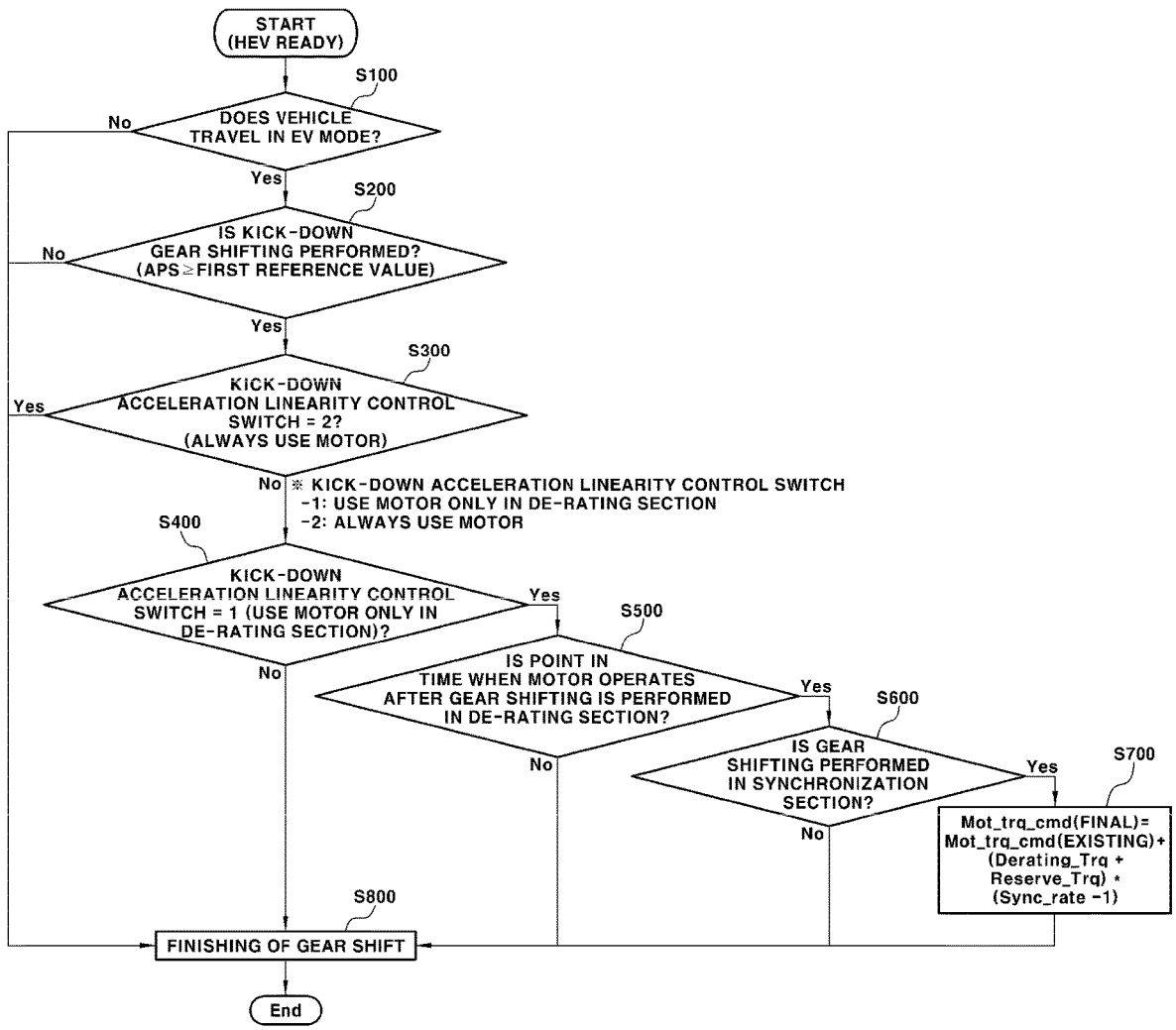
FIG. 4 is a flowchart for the method of controlling gear shifting in an electric vehicle according to the form of the present disclosure.

FIG. 4 illustrates a flowchart for the method of controlling gear shifting in an electric vehicle according to the form of the present disclosure.

The method includes a step of first determining whether or not the vehicle travels in the EV traveling mode (S100). The EV traveling mode in which the vehicle travels means a mode in which the vehicle travels using a drive force of the motor 120. When the gear shifting is performed, if a condition that a drive force is transferred from the motor 120 is satisfied, correction control of the torque of the motor 120 is performed.

Moreover, the method includes a step of determining whether or not kick-down gear shifting is required by a user in the EV traveling mode (S200). In a case where an amount of pressure applied to an accelerator pedal is at or above a first reference value, the control unit determines that the user makes the kick-down gear request.

In one form, when an accelerator sensor (APS) measures pressure applied to the accelerator pedal and the measured pressure is equal to or greater than the first reference value, the control unit determines that the kick-down gear shifting request is made.

The method includes a step of determining whether or not the acceleration linearity control of the torque of the motor 120 is possible, in a case where the above-described condition is satisfied and where the user makes the kick-down gear request in the EV traveling mode (S300).

To deal with a situation where a different acceleration linearity control request is input, the method includes a step in which the controller determines whether or not the user inputs an acceleration linearity constant-control request, when the acceleration linearity control is performed (S300) and determines whether or not the gear-shift synchronization section is reached, in a case where the acceleration linearity constant-control request is input (S600).

That is, the controller according to the present disclosure is configured in such a manner that, in a case where the acceleration linearity constant-control request is input, when a control for enabling the RPM of the motor 120 to follow the post-gear shifting target RPM, stored in the controller, of the motor 120 is possible (the synchronization section), the correction of the final torque of the motor 120 is performed.

The method includes a step in which, in a case where an acceleration linearity selective-control request is input into the controller (S400), it is determined whether or not the motor 120 at a point in time for the gear shifting operates in the de-rating section (the equal-power section for the motor 120) (S500), and in which, in a case where the motor 120 operates in the de-rating section, it is determined whether or not the gear-shift synchronization section is reached (S600).

The acceleration linearity selective-control is the correction control that is performed to prevent the torque of the motor 120 from decreasing when the motor 120 operates in the de-rating section. The method may further include a step of performing the correction of the torque of the motor 120 when the gear shifting is performed (S700).

However, in a case where the acceleration linearity control request is not set to be in the controller, or the gear-shift synchronization section is not reached, or in a case where the motor 120 is not in the de-rating section in a state where the acceleration linearity selective-control is set, the gear shift is set to be performed by the transmission 150 according to a setting value that is input from the transmission control unit 250 (S800).

The method includes a step in which the correction of the torque of the motor 120 is performed when the gear shifting is performed (S700), in a case where the acceleration linearity selective-control (S400) is set to be performed, where the gear shifting request is made when the motor 120 operates in the de-rating section (S500), and where it is determined that the gear shifting is to be performed in the synchronization section (S600).

In addition, the method includes a step in which the correction of the torque of the motor 120 is performed when the gear shifting is performed (S700), in a case where the acceleration linearity constant-control request is input (S300) and where it is determined that the gear shifting is to be performed in the synchronization section (S600).

In the step of performing the correction of the torque of the motor 120 when the gear shifting is performed, the final torque of the motor 120 is calculated by multiplying the sum of the de-rating torque of the motor 120 and the margin torque by the synchronization ratio, then adding the result of the multiplication to the torque command to the motor 120, which is received from the controller, and performing the acceleration linearity control selection control (S700).

At this point, the de-rating torque of the motor 120 is set to be calculated as a difference between the pre-gear shifting torque, stored in the controller, of the motor 120 and the post-gear shifting torque of the motor 120. The synchronization ratio is set to be calculated as the ratio of the value of the difference between the current RPM of the motor 120 and the pre-gear shifting driving RPM to the value of the difference between the post-gear shifting target RPM and the pre-gear shifting driving RPM, when the gear shifting is performed.

In this manner, the final torque command to the motor 120, which is applied when the gear shifting is performed, is set to be calculated with reference to the de-rating torque and the synchronization ratio on the basis of the received torque command to the motor 120, which is stored in the controller.

The method includes a step S800 of performing the gear shifting according to the final torque command to the motor 120. In the step of performing the gear shifting, the final torque command to the motor 120 is set to be corrected in real time until when the synchronization ratio changes from 0 to 1.

Figure 5:
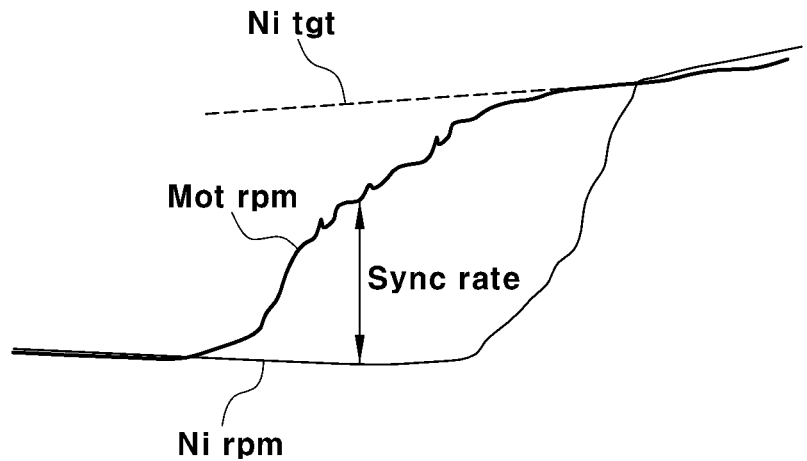
FIG. 5 is a graph illustrating a gear-shift synchronization section in the method of controlling gear shifting in an electric vehicle according to one form of the present disclosure.

FIG. 5 illustrates a graph for calculating the synchronization ratio when the gear shifting is performed.

The synchronization ratio according to the present disclosure is calculated as the RPM ratio of the motor 120 on the basis of the post-gear shifting target RPM and the pre-gear shifting driving RPM. The graph illustrates the pre-gear shifting driving RPM, the post-gear shifting target RPM, and the RPM of the motor 120 at a point in time when the gear shifting is performed. That is, the pre-gear shifting driving RPM is the same as the RPM of the motor 120. In a case where the gear shifting starts to be performed, the RPM of the motor 120 is set to follow the post-gear shifting target RPM.

The synchronization ratio is calculated as the ratio of the value of the difference between the current RPM of the motor 120 and the pre-gear shifting driving RPM to the value of the difference between the post-gear shifting target RPM and the pre-gear shifting driving RPM. In a case where the gear shifting first starts to be performed, the RPM of the motor 120 is set to be the same as the pre-gear shifting driving RPM, and thus the synchronization ratio is 0. At a point in time when the gear shifting is completed, the RPM of the motor 120 is set to be substantially the same as the target RPM, and thus the synchronization ratio is 1.

Therefore, the torque of the motor 120 at a gear shifting point in time is corrected on the basis of the synchronization ratio as a factor for correcting the torque of the motor 120 in such a manner that the linearity is maintained at the point in time when the gear shifting is completed.

Figure 6:
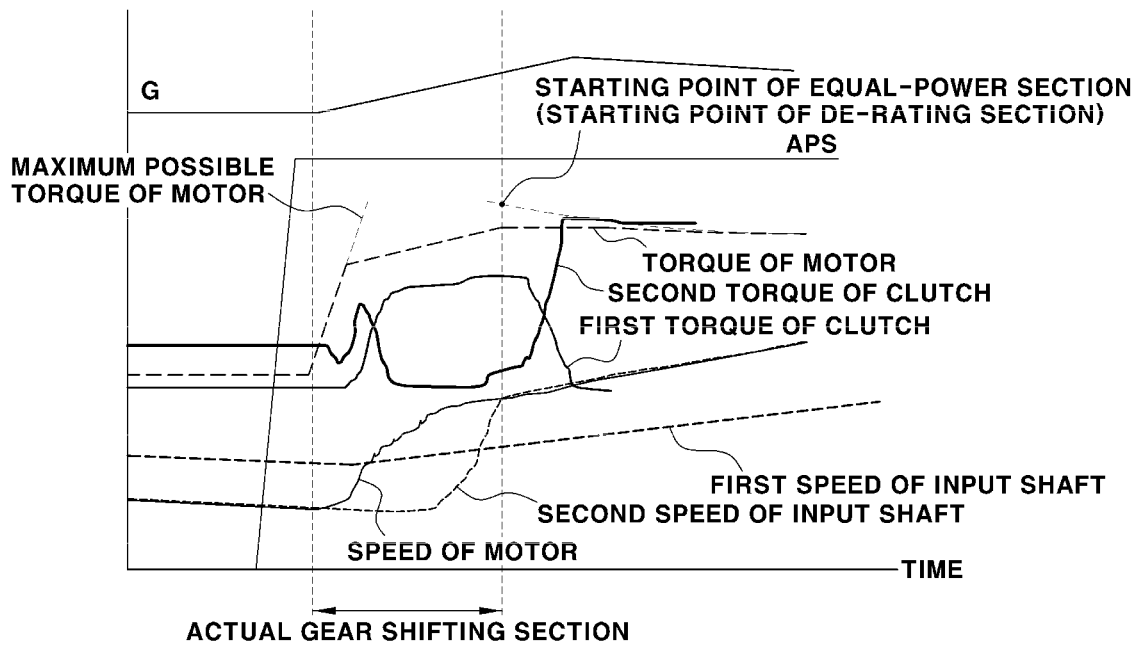
FIG. 6 is a graph illustrating the change in the driving relationship in the method of controlling gear shifting in an electric vehicle according to one form of the present disclosure.

FIG. 6 illustrates a graph of data that are actually measured with the method of controlling gear shifting in an electric vehicle according to the form of the present disclosure.

FIG. 6 illustrates a process in which the kick-down gear shifting request is made in the vehicle that travels in the EV traveling mode with the motor 120 being engaged with a first clutch (a pre-gear shifting clutch) and in which the gear shifting is performed in such a manner that the motor 120 is thus engaged with a second clutch (a post-gear shifting clutch).

In the process in which the gear shifting is performed to enable the motor 120 to be disengaged from the first clutch and then be engaged with the second clutch, the motor 120 operates in the equal-power section. The torque applied to the motor 120 is set to increase linearly through the acceleration linearity control.

Moreover, the RPM of the motor 120 in a gear shifting section is set to follow an input-axis (target) RPM of the second clutch. At the point in time when the gear shifting is completed, the RPM of the motor 120 has substantially the same value as the target RPM.

That is, in a case where the acceleration linearity control according to the present disclosure is performed and where the torque command, stored in the controller, to the motor 120, is thus corrected, the motor 120 is configured to increase linearly in the gear shifting section. Thus, a decrease in the torque when the gear shifting is performed, and the like can be prevented.

The present disclosure is described in detail above in an illustrative manner.

Although the specific form of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A method of controlling gear shifting in an electric vehicle, the method comprising:
   determining, by a controller, whether an electric vehicle travels in an electric vehicle (EV) traveling mode;
   determining, by the controller, whether a kick-down gear shifting is required in the EV traveling mode;
   in response to determining that the kick-down gear shifting is required, determining, by the controller, whether an acceleration linearity control is possible;
   in response to determining that the acceleration linearity control is possible, performing, by the controller, correction of a torque of a motor; and
   performing, by the controller, a gear shifting in a transmission based on the corrected torque of the motor.

2. The method of claim 1, further comprising:
   in response to determining that the kick-down gear shifting is required, determining, by the controller, whether a user inputs an acceleration linearity constant-control request; and
   in response to determining that the acceleration linearity constant-control request is input, determining, by the controller, whether a gear-shift synchronization section is reached.

3. The method of claim 1, further comprising:
   in response to determining that the kick-down gear shifting is required, determining, by the controller, whether a user inputs an acceleration linearity selective-control request;
   in response to determining that the acceleration linearity selective-control request is input, determining, by the controller, whether a point in time when the motor operates after the gear shifting is performed is in a de-rating section; and
   in response to determining that the point in time is in the de-rating section, determining, by the controller, whether a gear-shift synchronization section is reached.

4. The method of claim 1, wherein performing the correction of the torque of the motor includes:
   calculating, by the controller, a final torque of the motor by multiplying a sum of a de-rating torque of the motor and a margin torque by a synchronization ratio and then adding a result of the multiplication to a torque command to the motor, the torque command being received from the controller.

5. The method of claim 4, wherein the de-rating torque of the motor is calculated as a difference between a pre-gear shifting torque of the motor and a post-gear shifting torque of the motor.

6. The method of claim 4, wherein the synchronization ratio is calculated as a ratio of a value of a difference between a current revolutions per minute (RPM) of the motor and a pre-gear shifting driving RPM of the motor to a value of a difference between a post-gear shifting target RPM of the motor and a pre-gear shifting driving RPM of the motor when the gear shifting is performed.

7. The method of claim 4, wherein the torque command to the motor is a command stored in the controller.

8. The method of claim 1, wherein determining whether the kick-down gear shifting is required in the EV traveling mode includes:
   determining, by the controller, that the kick-down gear shifting is required, in a case where an amount of pressure applied to an accelerator pedal is equal to or greater than a first reference value.

\* \* \* \* \*